United States Patent [19]

Kasselmann et al.

[11] 4,253,550
[45] Mar. 3, 1981

[54] DISC BRAKE AND ADJUSTER THEREFOR

[75] Inventors: John T. Kasselmann, South Bend; James J. Colpaert, Granger, both of Ind.

[73] Assignee: The Bendix Corporation, Southfield, Mich.

[21] Appl. No.: 24,232

[22] Filed: Mar. 26, 1979

[51] Int. Cl.³ .............................................. F16D 65/56
[52] U.S. Cl. .............................. 188/71.9; 188/196 BA
[58] Field of Search ................... 188/72.9, 72.6, 72.7, 188/72.8, 73.4, 71.8, 71.9, 196 BA

[56] References Cited

U.S. PATENT DOCUMENTS

| | | | |
|---|---|---|---|
| 4,036,329 | 7/1977 | Anderson | 188/72.9 X |
| 4,117,910 | 10/1978 | Johannesen | 188/73.4 X |
| 4,142,611 | 3/1979 | Johannesen | 188/73.4 X |

FOREIGN PATENT DOCUMENTS 968897  9/1964  United Kingdom .................... 188/73.4

*Primary Examiner*—Douglas C. Butler
*Attorney, Agent, or Firm*—Paul David Schoenle; Ken C. Decker

[57] ABSTRACT

A disc brake assembly includes a frame which is movably disposed relative to a rotor and a central opening on the frame carries a pair of friction elements facing opposite sides of the rotor. An adjuster assembly is disposed within the central opening to control the position of the pair of friction elements relative to the rotor. The adjuster assembly includes a lever pivotally engaging the frame and an extendible assembly cooperating with the lever and frame to control the pivotal position of the lever relative to the frame. An actuator extends into the central opening and is engageable with one of the friction elements and the lever. Upon operation of the actuator, the one friction element separates from the lever to engage the rotor and the frame moves to engage the other friction element with the rotor. A pawl is responsive to movement of the actuator to control extension of the extendible assembly. The extendible assembly is carried on the lever at an end remote from the pivotal engagement with the frame. The lever carries a roller which is engageable with the actuator and a U-shaped section of the lever forms a pocket to receive the roller.

11 Claims, 3 Drawing Figures

DISC BRAKE AND ADJUSTER THEREFOR

BACKGROUND OF THE INVENTION

A disc brake such as illustrated in U.S. Pat. Nos. 4,117,910 and 4,129,200 and U.S. Pat. No. 4,142,611 shows a frame juxtapositioned to a rotor. The frame includes a central opening for receiving a pair of friction elements which are facing opposite sides of a rotor. The frame is movable during a brake application to move the pair of friction elements into engagement with the rotor. An adjuster extending between the frame and one of the pair of friction elements provides for maintaining the pair of friction elements closely adjacent the rotor, thereby compensating for lining wear on the pair of friction elements.

SUMMARY OF THE INVENTION

A disc brake assembly includes a frame with a central opening. A pair of friction elements disposed within the central opening face a rotor and an actuator extends into the central opening to engage one of the friction elements and an adjustment assembly. The adjustment assembly includes a lever pivotally engaging the frame, an extendible assembly carried between the lever and frame, and a pawl engageable with the actuator and extendible assembly. The lever carries the extendible assembly at an end remote from the pivotal engagement with the frame and offset from the actuator.

The lever and one friction element carry rollers which are engageable with the actuator and the lever is substantially U-shaped to define a pocket for receiving its roller. Upon operation of the actuator the one friction element and frame are movable to urge the pair of friction elements into engagement with the rotor. The pawl is movably carried on the frame to move in response to operation of the actuator. If the movement of the actuator is excessive the pawl operates to extend the extendible member so as to alter the pivotal location of the lever within the central opening.

It is an object of the present invention to provide an adjustment assembly in a disc brake assembly which is simple and compact.

DETAILED DESCRIPTION

Figure 1:
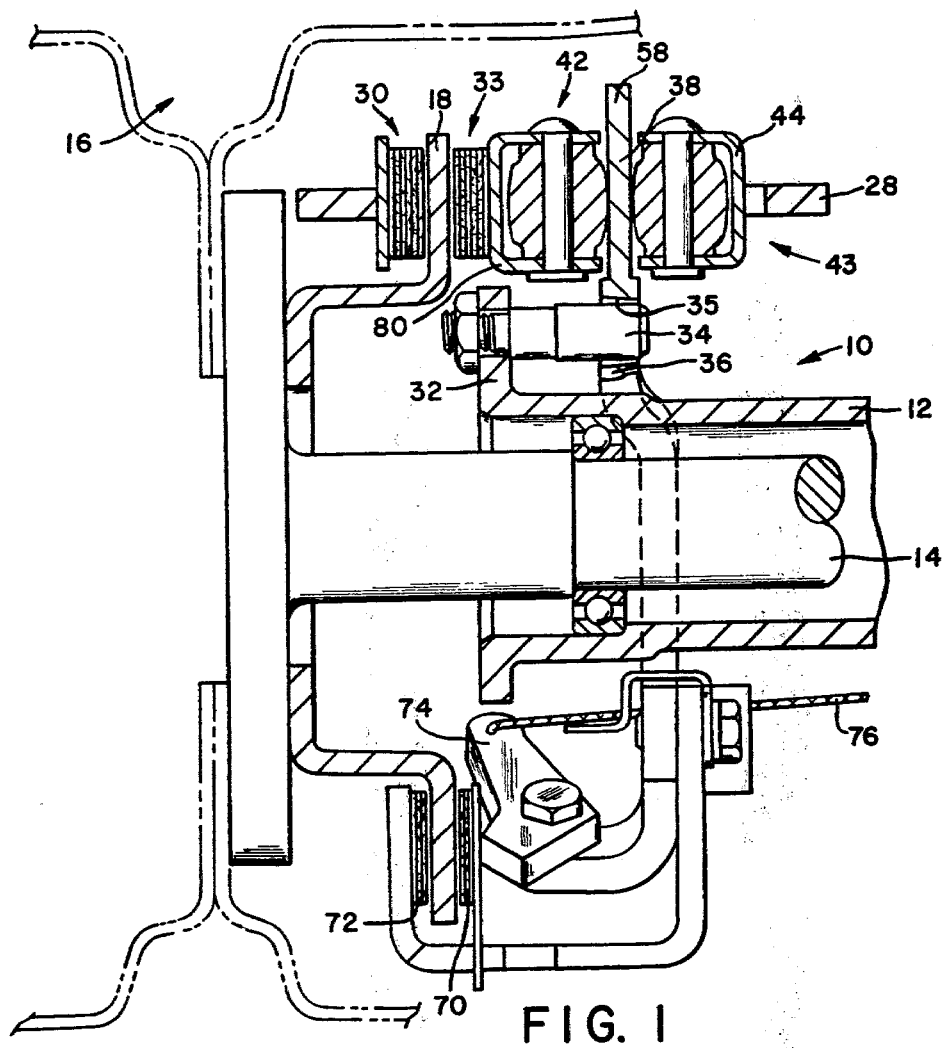
FIG. 1 is a cross-sectional view of a disc brake assembly constructed in accordance with the present invention.

In the disc brake assembly 10 shown in FIG. 1, an axle tube or support 12 rotatably receives an axle shaft 14 and the shaft couples to a wheel assembly 16. The shaft also carries a rotor or disc 18 such that rotation of the shaft and wheel assembly causes rotation of the rotor 18.

Figure 2:
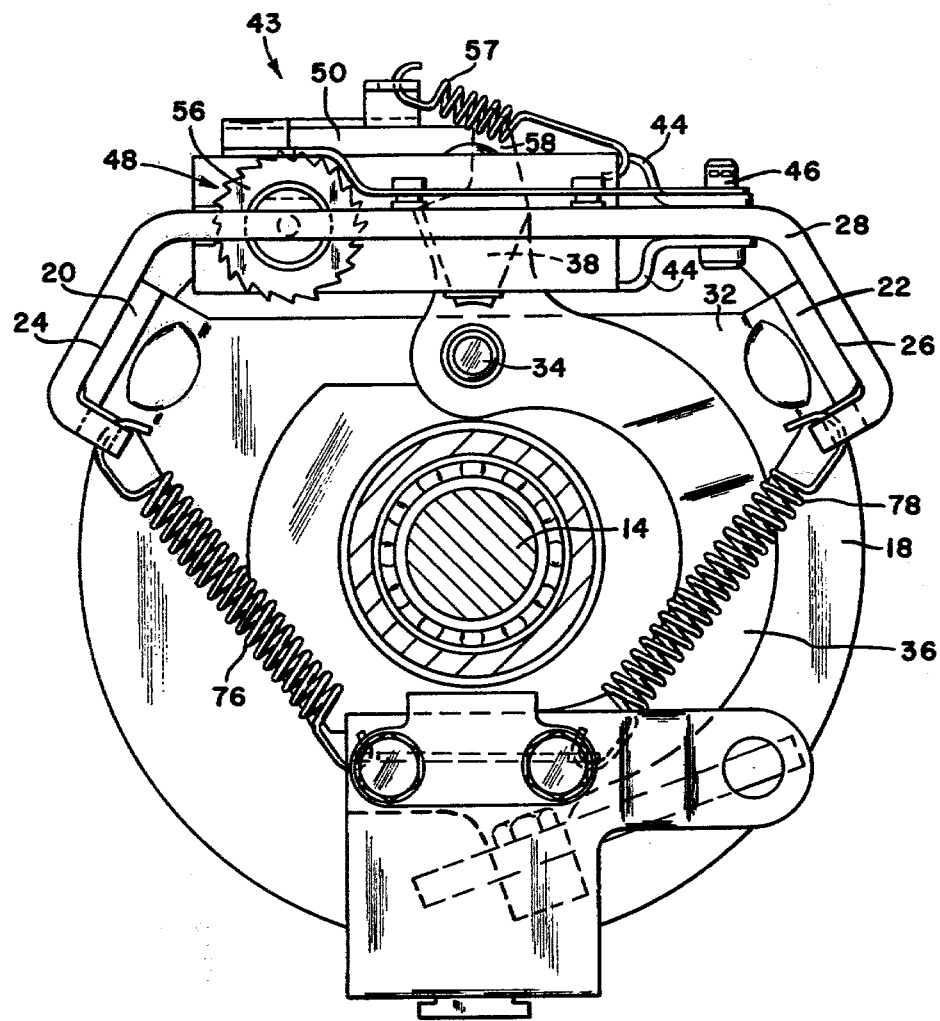
FIG. 2 is a right side view of the brake assembly shown in FIG. 1.

The support 12 defines a pair of radially extending arms 20 and 22, see FIG. 2, having respective guide surfaces 24 and 26. A caliper or frame 28 is slidably carried on the guide surfaces 24 and 26 and the frame movably carries a pair of friction elements 30 and 33, which are disposed on opposite sides of the rotor 18. The pair of friction elements are disposed within a central opening 29 having edges 31.

A flange 32 extends from the support 12 between the pair of arms 20 and 22 and a pin 34 is mounted on the flange. An actuator 36 is pivotally supported on the pin 34. The actuator 36 terminates at one end in a cam member 38. The cam member is engageable with a pair of rollers 40 and 42 such that movement away from a neutral position causes the rollers to separate. The roller 42 moves away from the roller 40 to urge the friction element 33 into engagement with the rotor 18 whereupon reaction forces acting on the frame 28 causes the latter to slide on the guide surfaces 24 and 26 to engage the friction element 30 with the rotor 18.

In accordance with the invention, an ajustment assembly 43 is carried within the central opening 29 to oppose the cam member 38. The adjustment assembly comprises an adjusting lever 44, an extendible assembly 48 and a pawl 50. The adjusting lever is pivoted to the frame 28 via pin 46. The adjusting lever carries the extendible assembly 48 opposite the pin 46 and the extendible assembly is engageable with the pawl 50. The pawl 50 is slidably mounted on the frame 28 via pins 52 and is provided with an edge 54 which is engageable with a ratchet wheel 56 of the extendible assembly. A spring 57 extending from the lever 44 to the pawl 50 bias the latter against a tab 58 extending from the top of cam member 38. The adjusting lever 44 is substantially U-shaped in cross section so as to define a pocket for receiving the roller 40.

Figure 3:
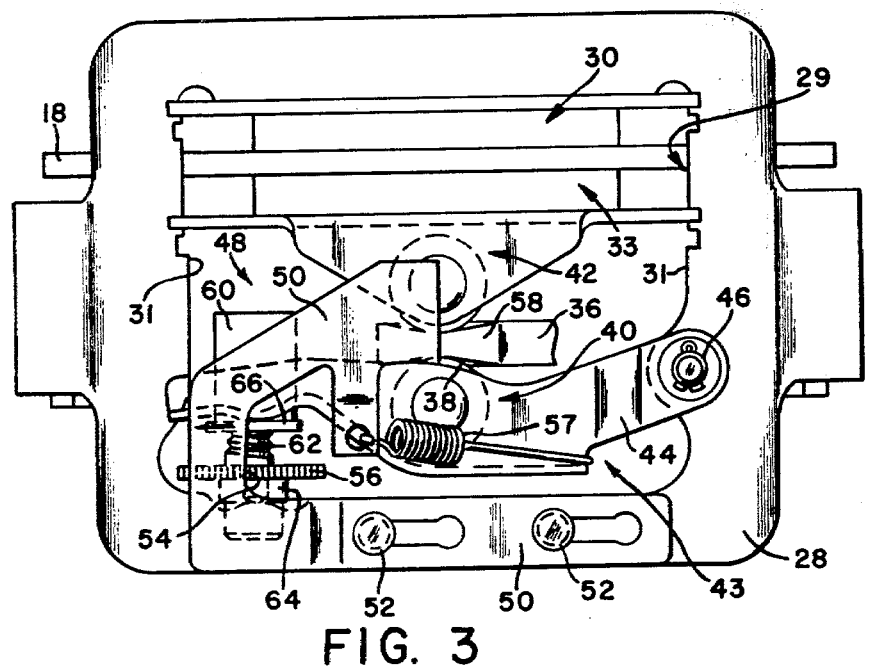
FIG. 3 is a partial top view of FIG. 2.

Turning to FIG. 3, the extendible assembly 48 includes a sleeve 60 secured to the end of lever 44. The sleeve 60 defines a threaded bore for receiving a threaded stem 62 and the stem fixedly secures the ratchet wheel 56 thereto. A block 64 forms a slot to receive a portion of the frame 28 and an opening in the block receives a reduced diameter portion of the threaded stem 62. The sleeve 60 extends through an opening 61 on the adjusting lever 44 and forms a flat surface 66 which engages the lever 44. The sleeve is prevented from rotating relative to the lever 44 by any suitable means.

In order to pivot the actuator 36 about pin 34, a pair of friction pads 70 and 72 are carried at the end of actuator 36 remote from cam member 38. An input lever 74 is pivotally secured to the remote end of the actuator 36 such that movement of the input lever by a cable 76 causes the friction pads 70 and 72 to frictionally engage the rotor 18 at a location substantially opposite the pair of friction elements 28 and 30. When the friction pads 70 and 72 contact the rotor 18, the rotation of the rotor causes the actuator 36 to rotate with the rotor so as to pivot about pin 34.

Viewing FIG. 2, the actuator 36 is arcuate in order to extend around the periphery of the axle tube 12. Moreover, there is sufficient clearance between the tube 12 and the actuator 36 to permit rotation of the latter in a clockwise direction. The actuator is biased to a neutral position by a pair of springs 76 and 78 extending from the remote end of the actuator to the arms 20 and 22, respectively.

MODE OF OPERATION

When the disc brake assembly 10 is operated, the cable 76 is pulled by a vehicle operator so that the lever 74 biases the friction pad 70 into engagement with the rotor 18. The tapered opening 35 which receives the pin 34 permits a slight amount of axial tilting for the actuator 36 so that the lever 74 causes the actuator to engage the friction pad 72 with the rotor. With both pads frictionally engaging the rotor, the actuator is rotated about pin 34 in the direction of the rotating rotor. The cam member 38 also pivots with the actuator to spread the rollers 40 and 42 apart. Consequently, the friction element 33 is directly moved into engagement with the rotor while the friction element 30 is moved into engagement with the rotor by the reaction of the frame 28 to move to the right in FIG. 1. Although the friction pads 70 and 72 retard the rotation of the rotor when in engagement therewith, it is the friction elements 28 and 30 which provide the majority of braking for the rotor 18.

Turning to FIG. 2, when the actuator 36 pivots about the pin 34, the tab 58 is moved to the right for clockwise rotation of the rotor or to the left for counterclockwise rotation of the rotor. The movement of the tab 58 causes the pawl 50 to slide to the right or left with the tab. Consequently, the edge 54 on the pawl is movable to impart rotation to the ratchet wheel 56. After successive brake applications, the friction linings of the pair of friction elements will wear so that further rotation of the actuator and increased movement of the tab will be necessary to effectuate braking of the rotor 18. This increased movement of the tab 58 causes the pawl edge 54 to index to successive teeth on the ratchet wheel and rotate the ratchet wheel under the force of spring 57. When the ratchet wheel 57 rotates, the sleeve 60 is moved away from the block 64 to pivot lever 44 toward the rotor 18. As a result, the roller 40 opposes the cam member 58 to adjust the position of the frame 28 relative to the guide surfaces 24 and 26. Moreover, the friction elements 28 and 30 are moved closer to the rotor 18 to take up the lining wear for the elements.

The extendible assembly 48 is offset relative to the actuator within the central opening 29 so that the rollers and the extendible assembly will compactly fit within the central opening.

As illustrated in FIG. 3, the roller 42 may be caged in a plate 80 which forms the backing plate for friction element 33. It is also possible to cage the roller 42 in a plate which is separate from but in contact with the friction element 33.

We claim:

1. In an adjuster for a disc brake assembly having a frame movably disposed relative to a rotor and cooperating with a pair of friction elements to urge the latter into engagement with the rotor, the frame including a central opening to receive the friction elements and an actuator is disposed substantially within the central opening, the actuator being operable to cause the pair of friction elements to move into engagement with the rotor, and the adjuster being responsive to wear of the friction elements to substantially maintain a predetermined running clearance with the rotor, the improvement wherein said adjuster includes a lever which is pivotally secured at one end to the frame, said adjuster also including an extendible assembly carried on said lever at the other end which cooperates with said lever to vary the position of said lever relative to the frame, and said lever opposes said actuator at an intermediate position between said ends to transmit movement to said frame in response to operation of said actuator.

2. In an adjuster for a disc brake assembly having a frame cooperating with a pair of friction elements to dispose the latter adjacent a rotor, an actuator operable during a brake application to urge the pair of friction elements into engagement with the rotor, adjustment means cooperating with the frame and the pair of friction elements to maintain a running clearance between the rotor and the pair of friction elements, said adjustment means comprising a lever pivotally engaging the frame and an extendible assembly cooperating with said lever to control the pivotal movement of said lever in response to the clearance between the rotor and the pair of friction elements exceeding the running clearance, and said lever pivoting relative to said frame in response to extension of said extendible assembly.

3. The disc brake assembly of claim 2 in which said lever is engageable with the actuator at an intermediate location and said lever includes an end remote from the pivotal engagement with the frame, said end being engageable with said extendible assembly.

4. The disc brake assembly of claim 2 in which a pawl is movably carried by the frame, said pawl engaging the actuator and the extendible assembly so as to impart movement to said extendible assembly in response to movement of the actuator.

5. The disc brake assembly of claim 2 in which said lever carries a roller which is engageable with the actuator.

6. An adjuster for a disc brake assembly comprising:
a frame having a central opening;
a pair of friction elements carried by said frame within said central opening adjacent a rotor;
a lever pivotally secured at one end to said frame and extending substantially into said central opening;
an actuator extending into said central opening and engaging one of said pair of friction elements and said lever, said actuator being operable to move said frame and said pair of friction elements to as to engage the latter with said rotor; and
an extendible assembly responsive to the operation of said actuator to control the pivotal movement of said lever relative to said frame, said extendible assembly engaging said lever other end and said frame to extend substantially within said central opening.

7. In an adjuster for a disc brake assembly, a frame having a central opening for receiving a pair of friction elements, said pair of friction elements being disposed adjacent a rotor, a lever pivotally secured at one end to said frame and extending substantially into the central opening, an actuator extending into the central opening in spaced relation to said frame between one of said pair of friction elements and said lever, said actuator being movable within the central opening to move said one friction element directly into engagement with said rotor and to move the other friction element into engagement with said rotor in response to movement of said lever and frame relative to said rotor, and an extendible assembly carried between said frame and the other end of said lever and responsive to movement of said actuator to vary the pivotal location of said lever relative to said frame.

8. The disc brake assembly of claim 7 in which said actuator is engageable with said one friction element and said lever at a first axial position and said extendible assembly is engageable with said lever at a second axial position spaced from said first axial position.

9. In an adjuster for a disc brake assembly having a frame with a central opening for receiving a pair of friction elements, the frame being movable relative to a rotor to engage one of the friction elements with the rotor, an actuator cooperating with the other friction element and the frame to move the frame and other friction element so as to engage the pair of friction elements with the rotor, and adjustment means disposed within the central opening to control the position of the pair of friction elements relative to the rotor, the improvement wherein said adjustment means includes a lever pivotally secured at one end to the frame and an extendible assembly carried by said lever at said other end, said lever being substantially U-shaped between said ends so as to form a pocket and said pocket receives a roller which is engageable with the actuator, the actuator being operable to move relative to said roller.

10. The disc brake assembly of claim 9 in which said extendible assembly is disposed between the frame and said lever and a pawl extends from the frame to the actuator, said pawl being responsive to the operation of the actuator and engageable with the actuator to control extension of said extendible assembly.

11. The disc brake assembly of claim 9 in which said U-shaped lever includes an opening for receiving said extendible assembly.

* * * * *